UNITED STATES PATENT OFFICE.

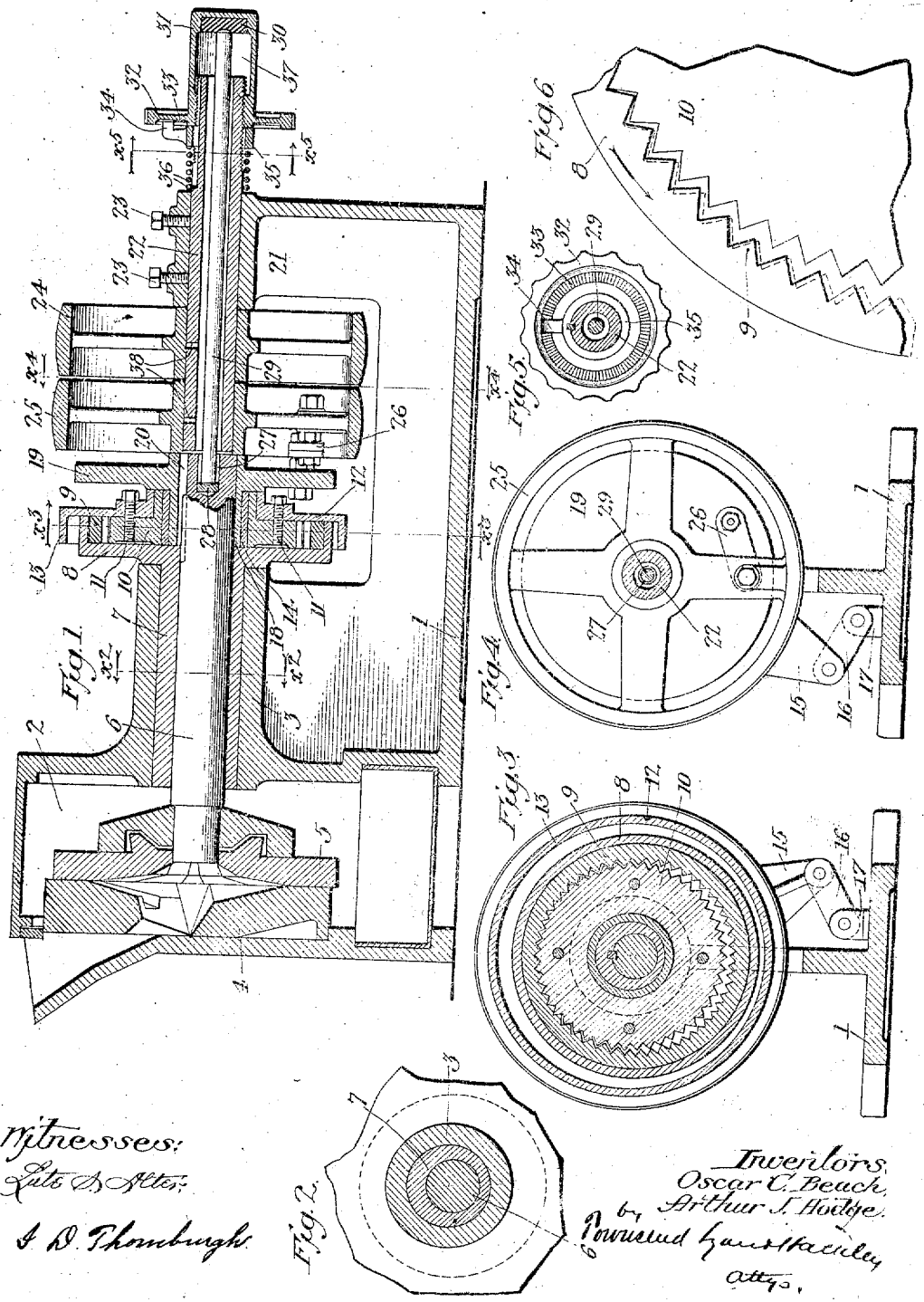

OSCAR C. BEACH, OF LOS ANGELES, AND ARTHUR J. HODGE, OF PASADENA, CALIFORNIA, ASSIGNORS TO F. W. BRAUN, OF LOS ANGELES, CALIFORNIA.

GEARING.

1,021,233.     Specification of Letters Patent.     Patented Mar. 26, 1912.

Application filed February 1, 1911. Serial No. 606,027.

*To all whom it may concern:*

Be it known that we, OSCAR C. BEACH and ARTHUR J. HODGE, both citizens of the United States, the said BEACH residing at Los Angeles, in the county of Los Angeles and State of California, and the said HODGE residing at Pasadena, in the county of Los Angeles and State of California, have invented new and useful Improvements in Gearing, of which the following is a specification.

This invention relates to a gearing especially adapted for use in disk pulverizers of a type shown in a former application of the said BEACH filed December 9, 1909, Serial No. 532,267. In machines of this character the disks are given a planetary motion in order to prevent grooves forming on them, and one of the objections to such machines is the noise made by the gearing which produces this planetary movement, and one of the main objects of the present invention is to produce the required planetary movement with as little noise as possible, and to provide a mechanism for producing the planetary movement which is of comparatively simple and economical construction.

Another object of the invention is to provide novel and improved means for adjusting the end thrust and to also provide improved means for lubrication.

Referring to the drawings: Figure 1 is a vertical, longitudinal section through the machine. Fig. 2 is a section on line $x^2$—$x^2$ Fig. 1. Fig. 3 is a section on line $x^3$—$x^3$ Fig. 1. Fig. 4 is a section on line $x^4$—$x^4$ Fig. 1. Fig. 5 is a section on line $x^5$—$x^5$ Fig. 1. Fig. 6 is an enlarged view of a portion of the internal gear and pinion meshing therewith, illustrating the formation of the teeth.

1 designates the base which is provided at one end with the pulverizing chamber 2 and a bearing 3. Within the pulverizing chamber 2 is the stationary pulverizing disk 4 and rotating pulverizing disk 5. The disk 5 in addition to rotating, also has a bodily movement in a path eccentric to the action of the stationary disk 4, so that all lines of rotation on the face of the disk 5 constantly change position with respect to the face of the stationary disk 4 which prevents grooving of the disks. The rotating disk 5 is carried on a shaft 6, the latter being mounted in a hub 7 which is journaled in the bearing 3. The hub 7 is bored eccentrically to receive the shaft 6, so that the latter has an eccentric position in the hub 7 and bearing 3. Thus as the hub 7 rotates the shaft 6 will be given a bodily eccentric movement. The hub 7 is formed as part of a flange 8 which is cupped and carries an internal gear 9, the teeth of which are triangular, as shown in Fig. 3, and the internal gear 9 is preferably formed of babbitt which renders it practically noiseless in operation and enables its easy replacement when worn and is very economical of construction. 10 designates the pinion which also has triangular teeth meshing with the internal gear 9, the pinion 10 being of cast iron. Owing to the large number of teeth which are in engagement between the pinion 10 and internal gear 9, the driving strain is distributed over a large number of teeth and the Babbitt metal of which the internal gear 9 is constructed is sufficiently strong. The pinion 10 is secured by bolts 11 to a disk 12 which has a flange 13 which projects over the internal gear and pinion and acts as a housing and is mounted on a bronze bushing 14. The disk 12 has an ear 15 which is connected by a link 16 with a bracket 17 on the frame 1 which prevents the disk from axial rotation, but permits it to partake of a bodily orbital or eccentric movement. The bushing 14 has a bearing on an eccentric hub 18 which is formed as part of a driving disk 19, the latter being secured to the shaft 6 by a feather 20 and rotating therewith. At the other end of the frame 1 is a bearing 21 in which is mounted a stationary hollow arbor 22, being secured by set screws 23.

Rotatable on the arbor 22 are pulleys 24 and 25, pulley 24 being an idle pulley and pulley 25 a driving pulley which is connected by a link 26, as shown clearly in Fig. 4, with the driving disk 19. Thus as the pulley 25 rotates, it imparts rotation to the driving disk 19 and the latter through the feather 20 drives the shaft 6, thereby imparting axial rotation to the rotating pulverizing disk 5. As the shaft 6 thus rotates, obviously the driving disk 19 which is mounted thereon, and engages the feather 20 accompanies the shaft 6 in its eccentric bodily movement, the strap 26 permitting of this relative movement of the driving disk 19 with respect to the pulley 25. And as the shaft 6 and driving disk 19 move eccentrically bodily, the latter carries bushing 14 bodily which in turn imparts an eccentric bodily movement to the pinion 10 without, however, turning the pinion axially, the pinion 10 being bolted to the disk 8, being held against any axial movement by strap 16 and bracket 17, which connection, while preventing axial rotation, permits the eccentric bodily movement. As the pinion 10 thus moves eccentrically bodily, its teeth are given a planetary movement around the teeth of the internal gear 9 and owing to the less number of teeth in pinion 10 than in internal gear 9, it results in imparting a very slow axial rotation to the internal gear 9 and as the internal gear 9 is thus rotated, the flange 8 to which it is attached rotates the hub 7 and the latter carries the shaft 6 bodily in an orbit eccentric to the axis of rotation of the hub 7, thus moving the rotating pulverizing disk 5 in an orbit eccentric to the axis of the stationary pulverizing disk 4. The non-revoluble pinion 10, while held from rotation by the ear 15, link 16 and bracket 17, is permitted by the rocking movement of the link 16 to take its bodily movement.

The end of the shaft 6 is provided with a socket 27 in which is a hardened steel button 28 against which the end of a thrust pin 29 bears, the outer end of the thrust pin bearing against the fiber washer 30 in a cap 31 screwed on the threaded outer end of the stationary arbor 22, the cap 31 being provided with a hand wheel 32 permitting it to be turned, the face of the hand wheel 32 having a series of radial grooves 33 which are detachably engaged by a finger 34 on a sleeve 35 slidable on the outer end of the shaft 22, a coil spring 36 bearing against the sleeve 35 and holding the arm 34 in engagement with one of the grooves 33. Within the cap 31 is formed a grease chamber 37 into which grease may be placed and which will pass along the hollow arbor 22 and through grooves 38 to pulleys 24 and 25.

What we claim is:

1. A shaft, a revoluble hub having an eccentric bore in which the shaft is journaled, a driving disk eccentrically secured to the shaft and having a bodily eccentric movement therewith, a non-revoluble pinion journaled on the driving disk and having a bodily eccentric movement therewith, an internal gear meshing with said pinion and slowly rotated by the bodily movement of said pinion, said internal gear being secured to said hub and revolving the latter slowly.

2. A shaft, a revoluble hub having an eccentric bore in which the shaft is journaled, a driving disk eccentrically secured to the shaft and having a bodily eccentric movement therewith, a driving pulley, a link connecting the driving pulley and the driving disk, a non-revoluble pinion journaled on the driving disk and having a bodily eccentric movement therewith, an internal gear meshing with said pinion and slowly rotated by the bodily movement of said pinion, said internal gear being secured to said hub and revolving the latter slowly.

3. A shaft, a revoluble hub having an eccentric bore in which the shaft is journaled, a driving disk eccentrically secured to the shaft and having a bodily eccentric movement therewith, a non-revoluble pinion journaled on the driving disk and having a bodily eccentric movement therewith, a stationary bracket, a link connecting the bracket and non-revoluble pinion, an internal gear meshing with said pinion and slowly rotated by the bodily movement of said pinion, said internal gear being secured to said hub and revolving the latter slowly.

4. A shaft, a revoluble hub having an eccentric bore in which the shaft is journaled, a driving disk eccentrically secured to the shaft and having a bodily eccentric movement therewith, a driving pulley, a link connecting the driving pulley and the driving disk, a non-revoluble pinion journaled on the driving disk and having a bodily eccentric movement therewith, a stationary bracket, a link connecting the bracket and non-revoluble pinion, an internal gear meshing with said pinion and slowly rotated by the bodily movement of said pinion, said internal gear being secured to said hub and revolving the latter slowly.

5. A shaft, a revoluble hub having an eccentric bore in which the shaft is journaled, a driving disk eccentrically secured to the shaft and having a bodily eccentric movement therewith, a non-revoluble pinion with triangular teeth journaled on the driving disk and having a bodily eccentric movement therewith, an internal gear with triangular teeth of Babbitt metal meshing with said pinion and slowly rotated by the bodily movement of said pinion, said internal gear being secured to said hub and revolving the latter slowly.

In testimony whereof, we have hereunto set our hands at Los Angeles, California, this 12 day of January 1911.

OSCAR C. BEACH.
ARTHUR J. HODGE.

In presence of—
E. K. LUNZARDED,
RUDOLF WILDENHAYN.